United States Patent [19]
Soldano

[11] 3,715,316
[45] Feb. 6, 1973

[54] REACTOR SAFETY SPRAY SOLUTION BASE-BORATE

[75] Inventor: Benadetto A. Soldano, Oak Ridge, Tenn.

[73] Assignee: The United States of America as represented by the United States Atomic Energy Commission

[22] Filed: Jan. 28, 1971

[21] Appl. No.: 110,765

[52] U.S. Cl. ...................... 252/188, 23/309, 176/37, 176/58, 252/182, 423/216
[51] Int. Cl. ........................................... B01d 47/106
[58] Field of Search .......... 252/188, 182; 176/37, 58; 423/216, 223; 23/309

[56] References Cited

UNITED STATES PATENTS 3,630,942  12/1971  Soldano..............................252/188

OTHER PUBLICATIONS

Row, T.H., Nuclear Science Abstracts, Vol. 23, No. 15, Aug. 15, 1969, p29128.

Mishima, J., et al., "Removal of Methyl Iodide from Simulated Reactor Atmospheres with Hydrazine," Pro. of 9th AEC Air Cl. Conf., Vol. 1, Sept. 1966, Conf–660904.

*Primary Examiner*—Leon D. Rosdol
*Assistant Examiner*—Irwin Gluck
*Attorney*—Roland A. Anderson

[57] ABSTRACT

A nuclear reactor safety spray solution comprising an aqueous basic borate solution containing up to 1 volume percent sodium thiosulfate and an effective quantity of a metal salt which enhances the reaction rate of said solution with an organic iodide such as methyl iodide in contact with said solution, in comparison to the reaction rate between said iodide in contact with a solution which does not contain a rate-accelerating concentration of said salt.

2 Claims, No Drawings

3,715,316

REACTOR SAFETY SPRAY SOLUTION BASE-BORATE

BACKGROUND OF THE INVENTION

The invention described herein was made in the course of, or under, a contract with the U. S. Atomic Energy Commission.

The present invention relates to an improved composition and method for the removal of organic iodine from reactor containment atmospheres.

Many pressurized-water nuclear reactors include as part of their design a containment structure within which is included a spray solution for use in reducing pressure in the event of a nuclear reactor excursion such as a loss-of-coolant accident. It is also highly desirable to modify the composition of such sprays to include a reagent which rapidly removes and converts iodine fission product, existing in molecular or organic form, such as methyl iodide, into a form which would not be re-released during the course of an accident.

There are at present two principal standard reactor safety spray solutions which have been proposed for these several purposes. The first of these is a base-borate solution consisting of an aqueous solution of boric acid (about 3,000 parts per million boron) adjusted to a pH of about 9 with sodium hydroxide. The second is the same as the first except that it contains up to 1 percent (by weight volume) sodium thiosulfate, $Na_2S_2O_3$. Both are effective as a spray to remove molecular iodine from the ambient gaseous atmosphere within the containment structure. However, neither solution is satisfactory to remove iodine as an organic iodide. A base-borate solution without a reducing agent is regarded as virtually ineffective and a base-borate solution containing $Na_2S_2O_3$ is regarded as only partially effective. Lack of effectiveness is based on the slow kinetics of reaction between the organic iodide and the components of the spray. With this in mind, it is clear that it would be advantageous to accelerate the reaction between reactor sprays of the character described so that fission product iodine, as an organic iodide, can be rapidly removed from an ambient gaseous environment. It is, accordingly, the principal object of this invention to provide an improved reactor spray solution for accomplishing this desirable result. It is another object to modify the composition of known base-borate solutions so that they can react with organic iodides in a gaseous atmosphere at a kinetically rapid rate.

SUMMARY OF THE INVENTION

The present invention is predicated on the discovery of a class of reagent which, when added to a reference base-borate - thiosulfate solution, will accelerate the rate of reaction of said solution with organic iodides. When the selected class of reagent is added to a base-borate solution sans thiosulfate, the reaction rate will be comparable to that achieved by the reaction of the organic iodide with a base-borate solution containing thiosulfate.

In the course of reaction rate kinetic studies of the reaction between $CH_3I$ and base-borate spray solutions, I found that the rate of reaction of $CH_3I$, i.e., the rate at which it passes into the base-borate solution, is dependent on the extent to which it exists in the excited triplet state. In the presence of light or radiation of the kind generated in a nuclear reactor, it is hypothesized that the rate of reaction of $CH_3I$ and other organic iodides is dependent on the extent to which it exists in the excited triplet state. In the presence of such radiation, the ground state of the iodide molecule shifts to an excited, relatively short-lived (about $10^{-8}$ second) singlet state and thence to a relatively long-lived triplet state of about 1 second in duration. The triplet state is the most reactive of the three forms and we have utilized this interpretation of reaction kinetics in concrete form by introducing a class of reagents into the base-borate solutions which enhance the singlet-to-triplet transition of organic iodides. I have found that, when such reagents are added to the base-borate spray solutions described, the reaction of the gaseous organic iodides is indeed accelerated to effect conversion of iodine in organic form into the base-borate solution.

The reagents which enhance the conversion of the short-lived singlet state of organic iodides to the relatively long-lived triplet state to achieve the objects of this invention are base-borate-soluble inorganic and organic compounds of cobalt, nickel, mercury, europium, and gadolinium, in which the cobalt and nickel are in the +2 oxidation state and where the europium and gadolinium are in the +3 oxidation state while the mercury may be in the +2 (mercurous) or +3 (mercuric) oxidation state.

The exact nature of the salt which is most effective depends on its solubility in the base-borate solution or base-borate - thiosulfate solution at the concentration which will enhance the reaction rate of organic iodides with these solutions. The expected concentration of $CH_3I$ in a nuclear loss-of-coolant accident has been calculated to fall within the range $10^{-4}$ to $10^{-8}$ molar. To ensure an enhanced reaction rate in accordance with this invention the reactor spray solution should contain from $10^{-4}$ M to $10^{-5}$ M of a metal salt which enhances transition of singlet to triplet state of methyl iodide. In addition to solubility, selection of the salt will be limited by its chemical reactivity or corrosivity. Thus, a cobalt, nickel, mercury, gadolinium, or europium salt which reacts with the base-borate solution to form a precipitate is to be avoided. In terms of corrosivity, chloride ion should be avoided wherever the solution will be in contact with stainless steels subject to tress corrosion cracking. Typical of the salts which can be used with advantage to achieve the objects of this invention are nickel ammonium sulfate [$NiSO_4 \cdot (NH_4)_2SO_4 \cdot 6H_2O$], cobaltous ammonium sulfate [$CoSO_4(NH_4)_2SO_4 \cdot 6H_2O$], $Eu_2(SO_4)_3 \cdot 8H_2O$, $Gd_2(SO_4)_3$, and $Eu(NO_3)_3$ We have shown that the salts of this type, when added to a base-borate - thiosulfate solution, produces a pseudo first order rate of reaction between $Na_2S_2O_3$ and $CH_3I$ or other lower alkyl iodide.

The following examples show how the objects and advantages of this invention were demonstrated.

EXAMPLE I

This example shows the catalytic effect of an effective nickel salt on the rate of reaction of $CH_3I$ with a base-borate solution.

The experimental procedure was as follows: 125 cc of borated-base solution of 0.13 N $Na_2S_2O_3$ was equilibrated to temperature in a magnetically stirred solution. In addition, a sweep gas of $N_2$ was allowed to flow through the solution. The rate experiment was initiated by the injection of a micro amount of $CH_3I$ into the solution in order to make the starting concentration of $CH_3I$ in the 125 cc of solution $\approx 4 \times 10^{-8}$ molar.

At intervals of 1 minute the $N_2$ sweep gas flowing through the stirred solution was metered into a gas chromatograph and tested for $CH_3I$ concentration.

The removal of $CH_3I$ from the reaction vessel is therefore proportional to (1) $N_2$ gas flow rate, and (2) the rate of reaction of $CH_3I$ with the $Na_2S_2O_3$. In a semilog plot of $CH_3I$ peak height vs time, the slope represents the reciprocal of the pseudo first order rate constant, $1/k'$.

I call $k'$ a pseudo first order rate constant since the reaction of 0.13 N $Na_2S_2O_3$ with $4 \times 10^{-8}$ M $CH_3I$ is, in reality, a bimolecular reaction. However, since $4 \times 10^{-8}$ M $CH_3I$ would not alter the concentration of 0.13 N $Na_2S_2O_3$ after it is all reacted, the reaction can be treated as a pseudo first order reaction rate constant.

It should be noted that, according to this technique, the value $1/k'$ is both a function of the actual kinetic reaction rate and the $N_2$ sweep rate of $CH_3I$ from the reaction vessel. By repeating the original experiment several times as a function of differing $N_2$ gas flow rates, ranging from 10 cc/sec to 100 cc/sec, one obtains a straight relationship between the reciprocal of the pseudo rate constant $1/k'$ (ordinate) and the flow rate of $N_2$ (abscissa). By extrapolation of this linear plot to zero $N_2$ flow rate the intercept quantity of $1/k$ is obtained, which is the value shown in all the experimental tabulations. At zero flow rate and the only factor left to use up $CH_3I$ is that which reacts chemically with $Na_2S_2O_3$.

In the experiments with the $Ni(NH_4)_2 \cdot SO_4$ catalyst $\approx 4 \times 10^{-4}$ moles of the salt was used.

The effectiveness of $NiSO_4 \cdot (NH_4)_2 \cdot 6H_2O$ at various test temperatures is demonstrated in Table I, wherein reciprocal pseudo first order rate constants for the reaction between dilute ($\approx 10^{-8}$ molar) amounts of $CH_3I$ and 0.13 normal $Na_2S_2O_3$ in a pH 9.3 borated solution are tabulated.

TABLE I

| Temp. (°C.) | Reciprocal of Pseudo First Order Reaction Rate Constant | | | |
|---|---|---|---|---|
| | With Trace Catalyst | | Without Trace Catalyst | |
| | 1/k | k | 1/k | k |
| 25 | 6.3 | 16 | 12.3 | 8 |
| 30 | 4.2 | 24 | 6.1 | 16 |
| 35 | 2.7 | 38 | 4.2 | 24 |
| 40 | 1.7 | 60 | 3.0 | 33 |
| 50 | 0.8 | 125 | 1.43 | 70 |

EXAMPLE II

In an experiment conducted in the same way as described in Example I, the effect of the cobalt salt $CoSO_4(NH_4)_2SO_4$ on the rate of reaction between $Na_2S_2O_3$ and $CH_3I$ was tested. The results with a cobalt salt concentration ranging from $3 \times 10^{-5}$ to $4 \times 10^{-6}$ M when reacted with a solution 0.063 N in $Na_2S_2O_3$ and $4 \times 10^{-8}$ M in $CH_3I$ at various temperatures is shown below.

TABLE II

| Temp. (°C.) | Concentration of Catalyst in moles/liter | Reciprocal of Pseudo First Order Reaction Rate Constant | | | |
|---|---|---|---|---|---|
| | | With Trace Catalyst | | Without Trace Catalyst | |
| | | 1/k | k | 1/k | k |
| 25 | 0.0 | 12.3 | 8 | 12.3 | 8 |
| 25 | $3 \times 10^{-5}$ | 11.3 | 9 | 12.3 | 8 |
| 25 | $1 \times 10^{-4}$ | 10.0 | 10 | 12.3 | 8 |
| 25 | $2 \times 10^{-4}$ | 9.3 | 10.7 | 12.3 | 8 |
| 25 | $4 \times 10^{-5}$ | 8.2 | 12.2 | 12.3 | 8 |
| 30 | $\approx 4 \times 10^{-4}$ | 4.5 | 22 | 6.1 | 16 |
| 35 | $\approx 4 \times 10^{-4}$ | 3.6 | 30 | 4.2 | 24 |
| 40 | $\approx 4 \times 10^{-4}$ | 2.9 | 34.4 | 3.0 | 33 |

A comparison of the two tables shows that, while both salts have a rate-promoting effect, the nickel salt has the additional advantage of exhibiting the effect over a range of temperature while the cobalt salt loses its effectiveness at $\approx 40°C$. In either case, the effective amounts of salt are so small as to pose no discernable corrosion problem, or produce a precipitate.

Up to this point, it has been shown by representative examples that the excited triplet state of $CH_3I$ behaves as a kinetically different entity than the unexcited ground or less excited singlet state in base-borate - thiosulfate solutions which have been doped with selected inorganic salts of Co and Ni. Additional experiments have shown that the catalytic effect is specific to organic iodide. Thus, when the same experiments were run in the presence of inorganic iodides, no change in kinetics was noted showing the specificity of the catalytic effect on organic iodide.

A promising and fruitful extension of my discovery that certain cations are effective in promoting singlet-to-triplet transitions in organic iodides relates to the use of organic complexes of $Ni^{++}$, $Co^{++}$, $Gd^{+++}$, $Eu^{+++}$, as well as $Hg^+$ and $Hg^{++}$ which have organic groups capable of absorbing the organic iodide. It has been found in at least one case that, when europium, for example, is part of an organic complex, the rate of methyl iodide absorption into a borated solution is accelerated even in the absence of a reducing agent such as $Na_2S_2O_3$. Thus, the addition of $10^{-5}$ moles of an organic europium complex to a base-borate solution sans thiosulfate produced $CH_3I$ reaction rates comparable in magnitude to base-borate solutions containing 0.13 N $Na_2S_2O_3$. The results are summarized in Table III below.

TABLE III

Effect of Additives on the Reaction Rate of $\approx 10^{-8}$ Molar $CH_3I$ with 0.13 Normal $Na_2S_2O_3$ in Standard Base-Borate Solution

| Nature of Trace Additive | pH | Conc. in Moles/Liter | Temp. (°C.) | $\frac{1}{\text{Specific rate constant}}$ $= 1/k$, moles sec |
|---|---|---|---|---|
| None | 9.0 | | 25 | 13.8 |
| $Eu(OH)_3$ | 9.0 | $3.4 \times 10^{-6}$ | 26 | 9.4 |
| $Eu(OH)_3$ | 9.0 | $3.4 \times 10^{-6}$ | 40 | 1.7 |
| $Ni(OH)_2$ | 9.0 | $2.5 \times 10^{-5}$ | 26 | 7.5 |
| $Ni(OH)_2$ | 9.0 | $2.5 \times 10^{-5}$ | 40 | 1.7 |
| Europium Complex* | 9.0 | $2.7 \times 10^{-5}$ | 25 | 3.3 |
| Europium Complex* | 5.3 | $2.7 \times 10^{-5}$ | 25 | 3.2 |
| Europium Complex* | | $4 \times 10^{-5}$ | 30 | 4.3 |

\* Solution contains no reducing agent (Na$_2$S$_2$O$_3$), only 0.3% by wt of boron in form of borate.
Europium complex is CsEu (hfa)$_4$ where hfa is the anionic form of 1,1,1,1,5,5,5,hexafluoropentane-2,4-dione.

The data show clearly that rate constants obtained with a europium organic complex (i.e., the rate of disappearance of the CH$_3$I from the gaseous phase) was comparable to the rate obtained with inorganic nickel and cobalt salts added to base-borate-thiosulfate solutions. Similar enhanced kinetics may be expected with other organic complexes of the selected metal cations.

What is claimed is:

1. A nuclear reactor safety spray solution consisting essentially of an aqueous base borate solution consisting of a solution of boric acid (about 3,000 ppm boron) adjusted to a pH of about 9 with sodium hydroxide containing up to 1 volume percent sodium thiosulfate and an effective quantity of a metal salt which enhances the reaction rate of said solution with an organic iodide such as methyl iodide, the metal moiety of the effective salt being selected from the group consisting of nickel, cobalt, and mercury in the +2 oxidation state, gadolinium and europium in the +3 oxidation state, and mercury in the +1 oxidation state.

2. The nuclear reactor safety spray solution of claim 1 consisting essentially of said aqueous base borate solution and a quantity of NiSO$_4$·(NH$_4$)$_2$SO$_4$·6H$_2$O which accelerates the rate of reaction of said solution with methyl iodide.

\* \* \* \* \*